United States Patent [19]

Fleming

[11] Patent Number: 4,491,360

[45] Date of Patent: Jan. 1, 1985

[54] CONCEALED VISOR

[75] Inventor: Dennis J. Fleming, Holland, Mich.

[73] Assignee: Prince Corporation, Holland, Mich.

[21] Appl. No.: 403,567

[22] Filed: Jul. 30, 1982

[51] Int. Cl.³ .............................................. B60J 3/00
[52] U.S. Cl. .............................. 296/97 G; 296/97 H; 248/281.1; 248/293
[58] Field of Search ................ 296/97 H, 97 G, 97 K; 160/DIG. 3; 248/281.1, 293

[56] References Cited

U.S. PATENT DOCUMENTS

| Re. 24,706 | 9/1959 | McCormick | 296/97 |
|---|---|---|---|
| 1,885,510 | 11/1932 | Chapman | 296/97 |
| 2,102,454 | 12/1937 | Bennett | 296/97 |
| 2,289,644 | 7/1942 | Gano, Jr. | 296/97 G |
| 2,444,524 | 7/1948 | Parrish, Jr. | 296/97 |
| 2,509,601 | 5/1950 | Fuller | 296/97 |
| 2,559,471 | 7/1951 | Schrock | 296/97 |
| 2,585,769 | 2/1952 | Hamlin | 296/97 X |
| 2,594,813 | 4/1952 | Seibert | 160/120 |
| 2,733,763 | 2/1956 | Nygaard | 160/32 |
| 2,747,927 | 5/1956 | Burkhead | 296/97 R |
| 2,927,819 | 3/1960 | Johnson | 296/97 |
| 3,343,867 | 9/1967 | Couch et al. | 296/97 |

FOREIGN PATENT DOCUMENTS

| 36659 | 10/1926 | Denmark | 296/97 G |
|---|---|---|---|
| 1285392 | 12/1962 | France | |
| 391950 | 6/1933 | United Kingdom | 296/97 R |
| 1102089 | 2/1966 | United Kingdom | 296/97 G |

Primary Examiner—Randolph Reese
Assistant Examiner—Russell D. Stormer
Attorney, Agent, or Firm—Price, Heneveld, Huizenga & Cooper

[57] ABSTRACT

A visor includes a mounting structure secured to the headliner of a vehicle above a window and a pair of parallel spaced arms, each pivotally coupled at one end to the mounting structure secured to the vehicle headliner and having opposite ends pivotally secured to a visor. A cross arm extends between the spaced arms and is pivotally connected at each end to one of the arms at a position not aligned with the pivot connections of the arms to the vehicle or visor. The visor can be translated by rotation of the parallel arms between a raised or stored position above the window downwardly to a lowered use position. In the preferred embodiment of the invention, a module which can be snap-fitted to the vehicle roof is provided with the visor, and its control mechanism being recessed behind a decorative panel. In one embodiment of the invention, a motor is coupled to one of the pivot points to electrically lower and raise the visor to any selected position.

18 Claims, 9 Drawing Figures

CONCEALED VISOR

BACKGROUND OF THE INVENTION

The present invention relates to vehicle visors.

Conventional visors currently used in vehicles, such as automobiles, typically pivot vertically about a generally horizontal axis for movement from the raised stored position against the vehicle headliner to a lowered windshield position for use in blocking sunlight entering the vehicle from the front. Sliding visors of the type disclosed in U.S. Pat. Nos. 2,289,644 and 2,559,471 slide down from the headliner of a vehicle and are guided within an edge track. Operation of these visors can be extremely troublesome since frequently they will stick and be difficult to operate since they do not slide smoothly between a raised stored and a lowered use position.

SUMMARY OF THE INVENTION

The visor construction of the present invention overcomes the deficiencies of the prior art by providing a visor assembly which smoothly translates through pivot arms between a raised concealed position in the vehicle's headliner and a lowered use position.

Visors embodying the present invention include a mounting structure secured to the headliner or roof of a vehicle above a window and a pair of parallel spaced arms, each pivotally coupled at one end to the mounting structure secured to the vehicle headliner and having opposite ends pivotally secured to a visor. A cross arm extends between the spaced arms and is pivotally connected at each end to one of the arms at a position not aligned with the pivot connections of the arms to the vehicle or visor. The visor can be translated by rotation of the parallel arms between a raised or stored position above the window downwardly to a lowered use position. In the preferred embodiment of the invention, a module which can be snap-fitted to the vehicle roof is provided with the visor, and its control mechanism being recessed behind a decorative panel. In one embodiment of the invention, a motor is coupled to one of the pivot points to electrically lower and raise the visor to any selected position.

These and other features, objects and advantages of the present invention will become apparent upon reading the following description thereof together with reference to the drawings in which:

DETAILED DESCRIPTION OF THE PREFERRED EMBODIMENT

Figure 1:
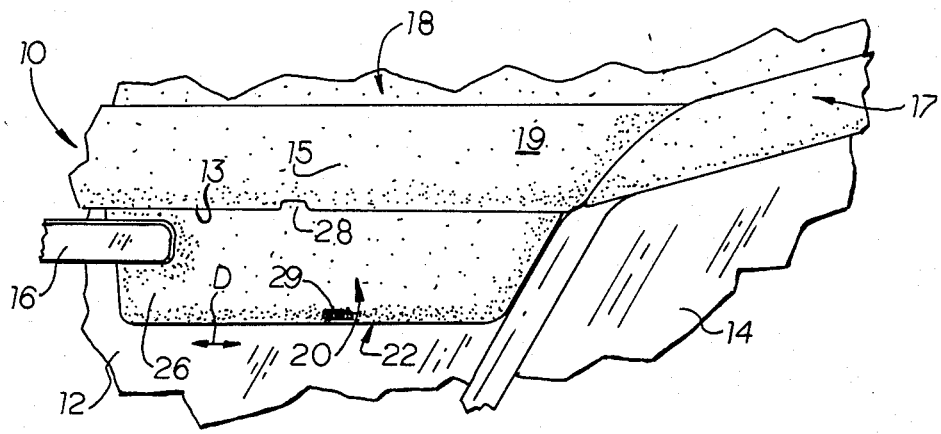
FIG. 1 is a fragmentary perspective view of a vehicle embodying a visor system of the present invention.

Referring initially to FIG. 1, there is shown the right front interior of a vehicle 10 which includes a windshield 12, a right side front passenger side window 14 and a rear view mirror 16. Extending above the windshield is the ceiling or headliner area 18 of the vehicle which typically is upholstered with a fabric 19 conforming to the vehicle's general interior decor. The headliner frequently will include a snap-in upholstered panel conventionally secured to the sheetmetal roof of the vehicle by means of conventional mounting structure adapted to receive snap fasteners, screws or the like. Extending along the lower edge of the headliner, just above the passenger window 14, is an integral side window visor assembly module 17 of the type described in co-pending U.S. patent application, Ser. No. 392,240 filed on June 25, 1982 and entitled SIDE WINDOW VISOR.

In FIG. 1, the front right side visor assembly 20 is shown in its lowered use position extended from an opening 13 between the windshield frame 13' (FIG. 2) and an upholstered cover panel 15 for the visor assembly 20. Panel 15 extends just above windshield 12 and across the top thereof to provide a decorative cover for substantially identical left and right visor assemblies, with only the right visor assembly 20 being illustrated. The construction and operation of the visor assembly 20 is now described in connection with FIGS. 2 through 8.

Figure 2:
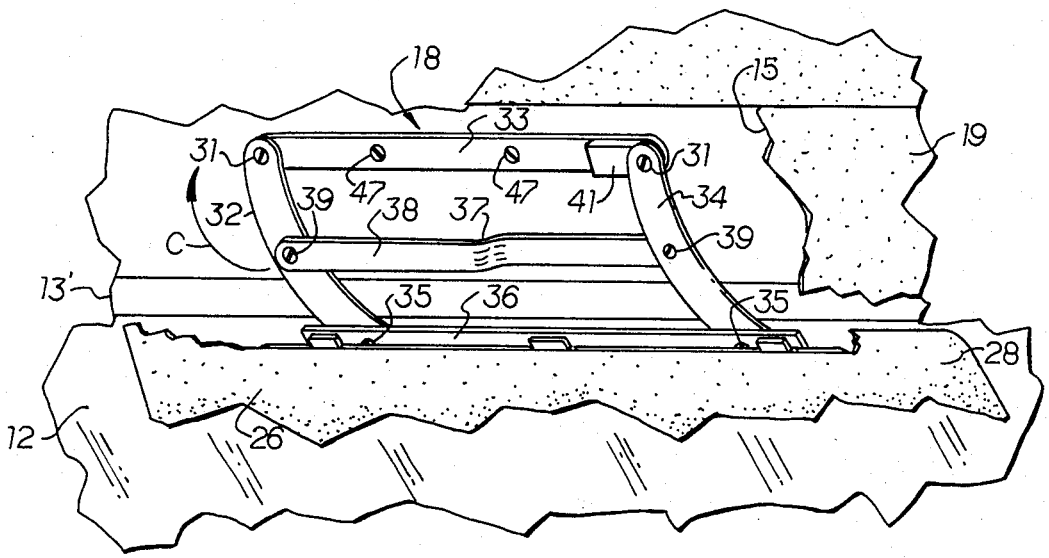
FIG. 2 is an enlarged fragmentary and partially broken away perspective view of a visor assembly embodying the present invention shown with the visor in the lowered use position.
Figure 6:
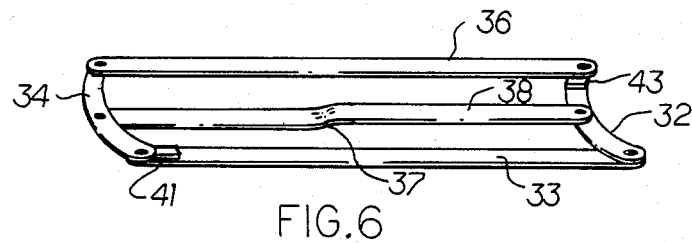
FIG. 6 is a top perspective view of the visor control shown in FIG. 3 taken in a direction indicated by arrow VI in FIG. 3.
Figure 7:
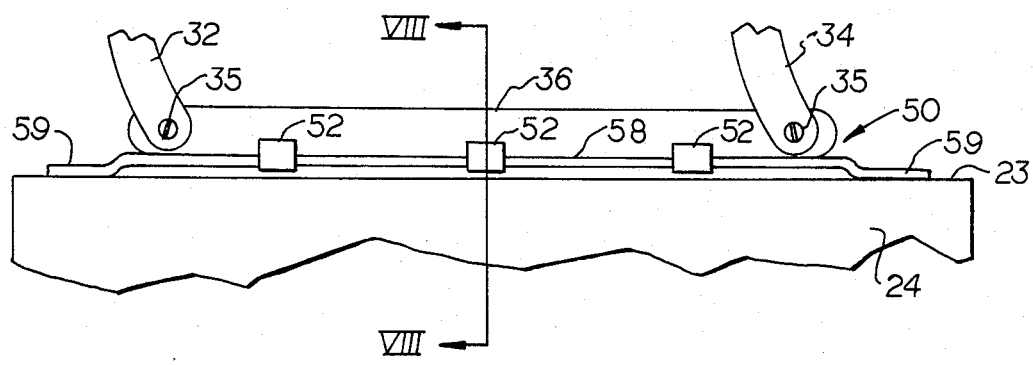
FIG. 7 is an enlarged, fragmentary and partly broken away front elevational view of the structure coupling the visor control to the visor.
Figure 8:
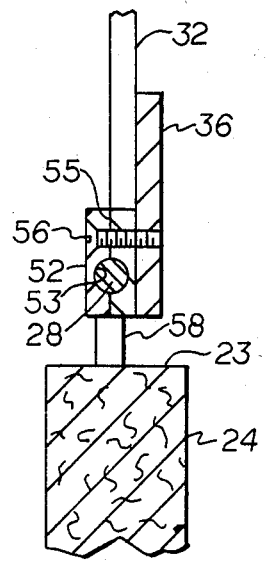
FIG. 8 is a fragmentary cross-sectional view of the structure shown in FIG. 7 taken along section line VIII—VIII of FIG. 7.

The visor assembly 20 comprises three elements including the sun screening panel 22 made of a visor body 24 (FIG. 8) covered by suitable upholstery material 26 corresponding in appearance to the vehicle's upholstery 19; a visor control 30, shown in detail in FIGS. 3 through 6; and a pivot coupling mechanism 50 extending between visor control 30 and visor body 24 and best seen in FIGS. 2, 7 and 8. Body 24 also can be made of an opaque or transparent smoked material. The visor control 30 permits the visor panel 22 to translate in a plane generally aligned with the window from a lowered position, shown in FIG. 1, upwardly, as illustrated in FIGS. 2, 3, 4 and 5, to a concealed position within the vehicle headliner behind upholstered panel 15. Pivot mechanism 50 couples the top edge of the visor body to control 30 permitting the visor panel 22, once the visor has been withdrawn from a stored position, to pivot forwardly along a generally horizontal axis against the windshield 12 or rearwardly to a vertical position or further, if desired. The construction of the visor control 30 is now described specifically with reference to FIGS. 2 through 6.

Figure 3:
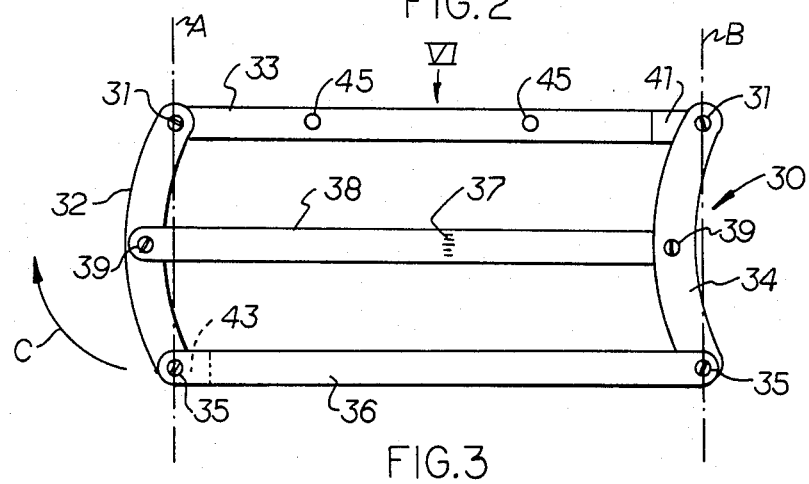
FIG. 3 is a front elevational view of the visor control structure shown in FIG. 2 and shown in one end position.
Figure 4:
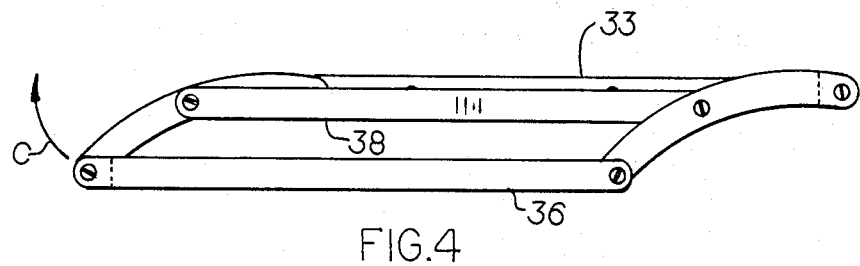
FIG. 4 is a front elevational view of the visor control shown in FIG. 3 rotated to an intermediate position.
Figure 5:
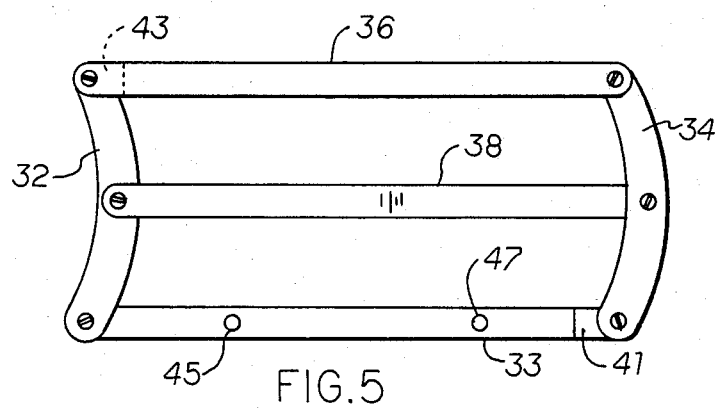
FIG. 5 is a front elevational view of the visor control shown in FIG. 3 rotated to a second end position.

Visor control 30 includes a pair of spaced arcuate shaped, substantially parallel arms 32 and 34 with first or upper ends pivotally coupled to a fixed support arm 33 by means of pivot couplings 31. The opposite end of arms 32 and 34 are coupled to a visor mounting lower arm 36 by pivot couplings 35. Pivot couplings 31 and 35 can be rivets, bolts or the like fitted through apertures in the arms with sufficient clearance to allow relative pivoting movement of the arms at the interconnecting points. A cross arm 38, having an offset 37 therein to provide clearance, as described in detail below, extends between arms 32 and 34 at the proximate mid-location thereof and is pivotally coupled at its opposite ends to the arms by means of pivot couplings 39 which are of the same construction as pivots 31 and 35. The location of coupling pivot 39 is offset from a line intersecting couplings 31 and 35, as illustrated by lines A and B in FIG. 3, which illustrate that pivot 39 does not fall in line with pivots 31 and 35. A first spacer 41 is positioned between arm 33 and arm 34 at pivot 31, as seen in FIGS. 3 and 6, while a second spacer 43 extends between arm 36 and arm 32 at pivot 35, as also shown in these Figures.

The visor control, in the preferred embodiment, includes a pivoted interconnection of five arms with a cross arm extending intermediate the parallel side arms. The three pivot points for each of the parallel arms 32 or 34 are offset such that a straight line extending between the any two pivot points for each arm will not intersect the third. This construction provides stability for the visor control as it is rotated from the visor lowered position, shown in FIGS. 1, 2 and 3, clockwise, as shown in arrow C in the Figures, to an intermediate position, shown in FIG. 4, and ultimately to a visor elevated and stored position, shown in FIG. 5. Spacers 41 and 43, as well as bend 37, permit cross member 38 to clear and pass over fixed member 33 as well as allow visor mounting member 36 to clear and pass over cross member 38 as the control moves from the intermediate position shown in FIG. 4 to the elevated position shown in FIG. 5.

The visor mounting arm 33 includes at least a pair of spaced apertures 45 to permit the member to be secured to the headliner of a vehicle by fastening screws 47 (FIG. 2). Although in the preferred embodiment, member 33 is secured to the sheetmetal of headliner 18 it is possible, in some embodiments, to employ the headliner itself as the stationary member and secure pivot connections 31 of arms 32 and 34 directly to the headliner in a pivotal fashion such that arms 32 and 34 will pivot directly on the headliner as opposed to on the stationary arm 33. Similarly, although arm 36 is provided and pivotally coupled at opposite ends to arms 32 and 34, this arm likewise can be integrally included by the visor body such that the opposite ends of arms 32 and 34 can be pivotally coupled directly to the visor body. It is important, however, that a cross arm 38 be provided and pivot on an axis offset from the other pivot axes such that a straight line drawn through any two pivot connections will not intersect the third. This provides a stable configuration such that as the visor control passes through a position approximately 20° rotated clockwise from that shown in FIG. 3 it will be permitted only to continue rotating in a clockwise direction in a stable fashion to the visor stored position shown in FIG. 5.

An adjustment structure 50, shown in FIGS. 7 and 8, is employed, in the preferred embodiment, to couple body 24 of visor panel 22 to control 30 to permit fore and aft adjustment of visor panel 22 once lowered into a use position (FIG. 1). Visor body 24 can be made of a suitable material such as a compressed fiber, a molded polymeric material such as polyvinyl chloride or the like. Coupled to the top edge 23 of body 24 is an elongated rod 58 having a shallow U-shaped configuration with end tabs 59 secured to the surface 23 of body 24 by suitable fastening means. The elevated central portion of rod 58 is spaced from the surface, as best seen in FIG. 7, and is pivotally coupled to a plurality of spaced blocks 52 having apertures 53 (FIG. 8) extending therethrough for pivotally holding rod 58 within the blocks. Blocks 52 in turn are secured to arm 36 by suitable fastening means such as recessed screws 56 (FIG. 8). Blocks 52 can be split, as shown by mating surfaces 55 (FIG. 8), for assembly onto rod 58. To provide a neat appearance to the visor assembly 20, the padded upholstery material 26 for the visor extends upwardly and over the adjustment mechanism 50 and lower arm 36 by a flap 28 which covers this mechanism and which is free to flex as the visor is pivoted along the general horizontal axis of rod 58 for adjustment of the visor.

In operation, the visor, as shown in FIG. 1, has been manually lowered to its use position and can be pivoted about axis 58 forwardly against the windshield 12 or rearwardly to a vertical or even beyond the vertical position to provide some fore and aft pivoted adjustment of the visor. Similarly, with the control assembly 30, the visor can move laterally in a direction indicated by arrow D in FIG. 1 to cover the upper right corner of the windshield, as illustrated in FIG. 1, or move to the left somewhat to cover more fully behind the rearview mirror without substantially elevating the visor within and behind panel 15. To store the visor in a concealed, raised position behind panel 15, the visor body is aligned with the panel by rotating it about axis 58 to be substantially co-planar with the arms of control mechanism 30 and pushed upwardly and to the left to rotate the visor control in a clockwise direction indicated by arrow C in the Figures through the position shown in FIG. 4 and to the stored position shown in FIG. 5 in which the visor is fully retracted behind panel 15. Panel 15 includes a notch 28 along its lower edge, and the lower lip of visor panel 22 includes a small handle 29 to facilitate lowering and raising of the visor between extended and retracted positions.

Figure 9:
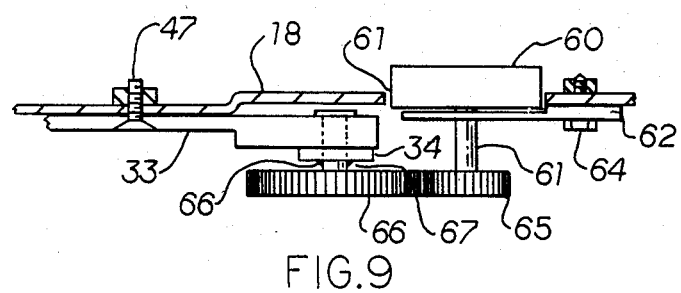
FIG. 9 is a cross-sectional, fragmentary top view of a motorized drive for the visor control shown in FIGS. 1 through 8.

An alternative embodiment employed to electrically raise and lower the visor is disclosed in FIG. 9 in which an electrical motor 60 is mounted within an aperture 61 formed in the sheetmetal headliner 18 of the vehicle. Motor 60 is fixedly secured thereto by means of a mounting plate 62 secured to the headliner by means of one or more bolts 64. Motor output shaft 61 is secured to a first, relatively small diameter drive gear 65 which meshes with a second gear 66 secured to pivot axle 68 which, in the preferred embodiment, is the pivot connection 31 associated with arm 34. In this embodiment, the motor 60 is fitted in the upper righthand corner of the structure, as shown in FIG. 2, such that this pivot point is driven. Shaft 66 is secured to arm 34 by means of welding indicated at 67 but is free to pivot within stationary arm 33 in turn secured to headliner 18 by fastening screws 47. Motor 60 is a reversible DC pancake-type motor having a relatively thin cross section, as illustrated in FIG. 9, and is coupled to the vehicle's power supply system by spring loaded center-off reversible single poll double throw switch (not shown) similar to that employed for automobile power windows such that the motor can be driven in opposite directions to rotate the visor control mechanism 30 between the raised visor stored position behind panel 15 and a lowered position illustrated in FIG. 1. Suitable limit switches can be provided in series with this electrical connection as required to automatically deactivate the motor when it has reached a limit extreme.

It will become apparent to those skilled in the art that various modifications to the preferred embodiment of the invention, as described herein, can be made without departing from the spirit or scope thereof as defined by the appended claims.

The embodiments of the invention in which an exclusive property or privilege is claimed are defined as follows:

1. A visor control assembly for a vehicle comprising:
    a visor body;
    at least a pair of substantially parallel rigid arms spaced from one another and means for pivotally coupling one end of each arm to said visor body at spaced locations thereon;
    means for pivotally coupling each parallel arm to a vehicle to permit movement of said visor panel on said arms between a raised stored position and a lowered use position; and
    a cross arm extending between said parallel arms and having opposite ends pivotally coupled to said parallel arms to stablize the motion of said parallel arms wherein the pivot coupling of each end of said cross arm is offset from a line between the pivot couplings of each parallel arm to said visor body and a vehicle, and wherein each parallel arm is shaped to provide said offset pivotal coupling of said cross arm to said parallel arms.

2. The apparatus as defined in claim 1 wherein said means for pivotally coupling each of said parallel arms to said visor body comprises a lower arm extending between and pivotally coupled to said parallel arms.

3. The apparatus as defined in claim 2 wherein said means for pivotally coupling each of said parallel arms to said visor body further includes a pivot rod fixedly mounted to one of said visor body or lower arm and extending generally parallel to the plane of said visor body and means mounted to the other of said visor body or lower arm for pivotally supporting said pivot rod to permit said visor to move in fore and aft directions in a vehicle.

4. The apparatus as defined in claim 3 wherein said means for pivotally coupling each arm to a vehicle comprises a support arm to which ends of said parallel arms are pivotally secured.

5. The apparatus as defined in claim 4 and further including a cover panel positioned to cover said support arm and visor body when in a raised position and permitting said visor to extend therethrough for movement to a lowered position.

6. The apparatus as defined in claim 5 wherein said cross arm is generally parallel to said lower arm.

7. A visor control assembly for a vehicle comprising:
    a visor body;
    at least a pair of substantially parallel arms spaced from one another and a lower arm extending between and pivotally coupled to said parallel arms at one end for pivotally coupling said one end of each arm to said visor body at spaced locations thereon;
    a support arm for pivotally coupling an end of each parallel arm to a vehicle to permit movement of said visor panel on said arms between a raised stored position and a lowered use position;
    a cover panel positioned to cover said support arm and visor body when in a raised position and permitting said visor to extend therethrough for movement to a lowered position;
    a cross arm extending between said parallel arms and having opposite ends pivotally coupled to said parallel arms to stabilize the motion of said parallel arms wherein the pivot coupling of each end of said cross arm is offset from the pivot couplings of each parallel arm to said visor body and vehicle and wherein each parallel arm is arcuate to provide said offset pivotal coupling of said cross arm to said parallel arms; and
    a pivot rod fixedly mounted to one of said visor body or lower arm and extending generally parallel to the plane of said visor body and means mounted to the other of said visor body or lower arm for pivotally supporting said pivot rod to permit said visor to move in fore and aft directions in a vehicle.

8. A visor assembly for a vehicle including a visor body, a visor control for moving said visor body, and adjustment means coupling said visor body to said visor control, wherein said visor control comprises:
    a pair of parallel rigid arms spaced from one another and means for pivotally securing one end of each arm to said adjustment means;
    a cross arm extending between said parallel arms and having ends pivotally coupled to said parallel arms to stabilize the motion of said parallel arms wherein the pivot coupling of each end of said cross arm is offset from a line between the pivot couplings of each parallel arm to said adjustment means and vehicle headliner; and
    means for pivotally securing each parallel arm to a vehicle headliner to permit movement of said visor panel by said arms in a plane generally orthogonal to the pivot axes of said arms and generally parallel with said arms between a raised stored position and a lowered use position.

9. The apparatus as defined in claim 8 wherein said adjustment means includes a lower arm extending between and pivotally coupled to said parallel arms at said one ends.

10. The apparatus as defined in claim 9 wherein said adjustment means further includes a pivot rod fixedly mounted to one of said visor body or lower arm and extending generally parallel to the plane of said visor body and means mounted to the other of said visor body or lower arm for pivotally supporting said pivot rod to permit said visor to move in fore and aft directions in a vehicle.

11. The apparatus as defined in claim 10 wherein said securing means comprises a support arm to which ends of said parallel arms are pivotally secured.

12. The apparatus as defined in claim 11 and further including a cover panel positioned to cover said support arm and visor body when in a raised position and permitting said visor to extend therethrough for movement to a lowered position.

13. The apparatus as defined in claim 12 wherein said cross arm is generally parallel to said lower arm.

14. A visor assembly for a vehicle including a visor body, a visor control for moving said visor body, and adjustment means coupling said visor body to said visor control, wherein said visor control comprises:
    at least a pair of parallel arms spaced from one another and means for pivotally securing one end of each arm to said adjustment means;
    a cross arm extending between said parallel arms and having ends pivotally coupled to said parallel arms to stabilize the motion of said parallel arms wherein the pivot coupling of each end of said cross arm is offset from a line between the pivot couplings of each parallel arm to said adjustment means and vehicle headliner, and wherein each parallel arm is arcuate to provide said offset pivotal coupling of said cross arm to said parallel arms; and means for pivotally securing each parallel arm to a vehicle headliner to permit movement of said visor panel by said arms in a plane generally orthogonal to the pivot axes of said arms and generally parallel with said arms between a raised stored position and a lowered use position.

15. A visor assembly comprising:

a visor body;

a visor control including a pair of parallel rigid arms spaced from one another and means for pivotally securing one end of each arm to a vehicle headliner and means for pivotally mounting the opposite end of each parallel arm to a visor body for translating said visor body in a pivoting manner in a plane generally parallel to a vehicle window between a raised stored position and a lowered use position wherein each of said parallel arms include three apertures formed therein and arranged in a pattern of a triangle with an aperture near each end of each of said parallel arms for the pivot connection of each arm to a vehicle at one end and a visor body at the opposite end and wherein the remaining aperture is located between the first named apertures; and a cross arm extending between said parallel arms and having ends pivotally coupled to said remaining aperture of said parallel arms to stabilize the motion of said parallel arms.

16. The apparatus as defined in claim 15 wherein each of said parallel arms are arcuate-shaped.

17. A visor assembly comprising:

a visor body;

a visor control adapted to be mounted to a vehicle headliner for mounting the visor body thereto for translating said visor body in a pivoting manner in a plane generally parallel to a vehicle window between a raised stored position and a lowered use position wherein said visor control comprises at least a pair of parallel arms spaced from one another and means for pivotally securing one end of each arm to said adjustment means, a cross arm extending between said parallel arms and having ends pivotally coupled to said parallel arms to stabilize the motion of said parallel arms, wherein each parallel arm is arcuate to provide offset pivotal coupling of said cross arm to said parallel arms;

means for pivotally securing each parallel arm to a vehicle headliner to permit movement of said visor panel by said arms in a plane generally orthogonal to the pivot axes of said arms and generally parallel with said arms between a raised stored position and a lowered use position;

adjustment means for coupling said visor control to said visor body to permit said visor body to be moved in a fore and aft direction when in a lowered use position, wherein said adjustment means includes a lower arm extending between and pivotally coupled to said parallel arms at said one ends and a pivot rod fixedly mounted to one of said visor body or lower arm and extending generally parallel to the plane of said visor body and means mounted to the other of said visor body or lower arm for pivotally supporting said pivot rod to permit said visor to move in fore and aft directions in a vehicle; and a cover panel positioned to cover said support arm and visor body when in a raised position and permitting said visor to extend therethrough for movement to a lowered position.

18. The apparatus as defined in claim 17 wherein said cross arm is generally parallel to said lower arm.

* * * * *